No. 48906

L. A. Cauvet

Insulator for Telegraph Wires.

No. 3,847 Reissued Feb 22, 1870.

Witnesses:
Thos Tusch
Wm Treurn

Inventor
Louis A. Cauvet

UNITED STATES PATENT OFFICE.

LOUIS A. CAUVET, OF NEW YORK, N. Y.

IMPROVEMENT IN INSULATORS.

Specification forming part of Letters Patent No. 48,906, dated July 25, 1865; Reissue No. 3,847, dated February 22, 1870.

*To all whom it may concern:*

Be it known that I, LOUIS A. CAUVET, of New York, in the county of New York, and State of New York, have invented certain new and useful Improvements in Insulators for Telegraph-Wires; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in constructing an insulator of glass and attaching it to a wooden pin or bracket in a novel manner, whereby the use of cement and metal pins or brackets is dispensed with and the device can be readily formed complete at the factory, ready for convenient and speedy attachment to the poles along the line without further preparation, as hereinafter more fully explained.

Figure 2:
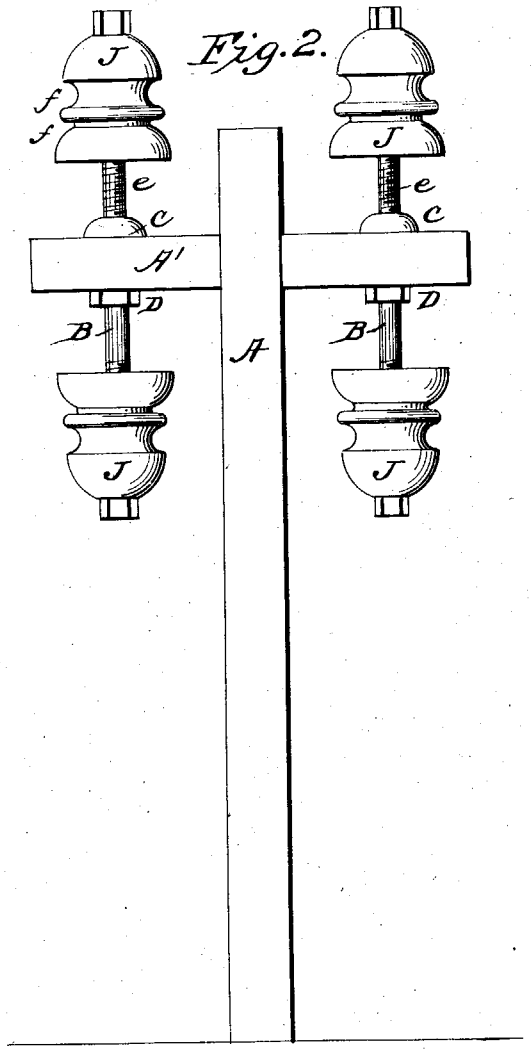
Figure 1:
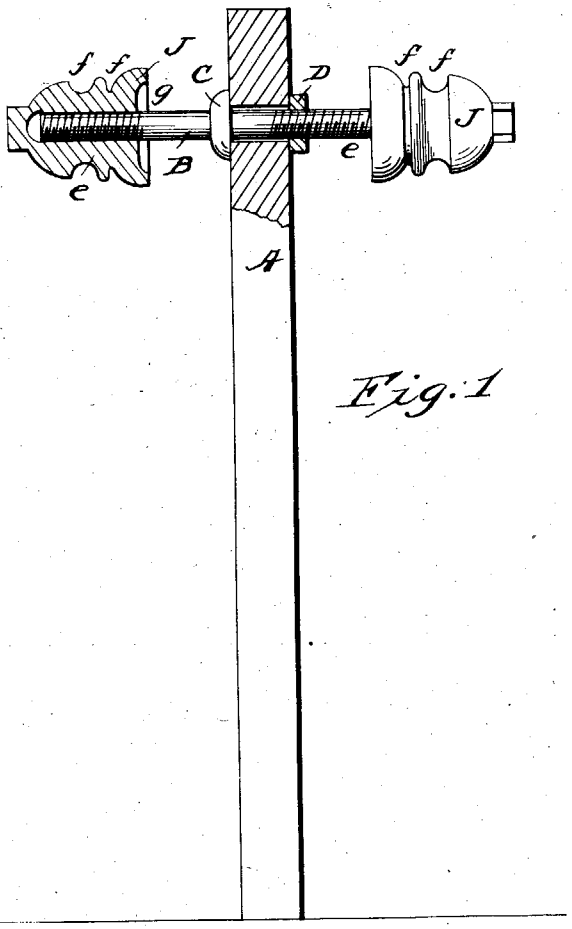

Figure 1 represents a telegraph-pole with two insulators attached to a single pin, a portion being shown in section. Fig. 2 represents a telegraph-pole having four of the insulators attached.

The insulator J is made of glass, molded in any suitable form, and having one or more grooves, *f*, formed on its exterior to enable a wire to be wound around it, the base of the insulator J being made either flat or concave. It is made with a hole or cavity extending longitudinally almost through it, as represented in Fig. 1, a screw-thread being formed in the wall surrounding said cavity, in the act of molding the glass, by a process well known to glass-molders. I then provide a wooden pin or bracket, of any suitable form, and cut on its end a screw-thread corresponding to that formed in the glass, so that the glass J may be screwed on to it, and thereby securely unite the two together.

In the drawings I have represented this wooden pin, B, of sufficient length to extend through the pole A and project far enough on each side to support an insulator at each end; and in Fig. 2 the pins are represented as projecting in a similar manner through a cross-bar, A′, attached to the pole A, the object being to represent two insulators supported on a single pin, one at each end. It is obvious, however, that the pins may be of less length, having an insulator, J, attached at one end, and its opposite end secured in any suitable manner to the pole.

Instead of having the pin B enter a hole in the pole it may be nailed to the side of the pole in the manner that brackets have heretofore been fastened, this fastening of the pin to the pole forming no part of my invention.

By this method of constructing and uniting the insulator and its pin or bracket I avoid the use of either cement or metal of any kind.

The article thus made can be all finished at the factory complete, and from thence conveyed to any point where required for use and attached to poles with the greatest facility.

The device, as a whole, thus forms an article of manufacture, to be furnished to any parties desiring them, either for use or sale.

Having thus described my invention, what I claim is—

The glass insulator J, provided with an internal screw-thread, in combination with a wooden pin or bracket having a corresponding screw-thread formed thereon, substantially as described.

LOUIS A. CAUVET.

Witnesses:
H. B. MUNN,
W. C. DODGE.